(12) United States Patent
Chriss et al.

(10) Patent No.: US 7,583,792 B2
(45) Date of Patent: Sep. 1, 2009

(54) TESTING A DATA-PROCESSING SYSTEM WITH TELECOMMUNICATIONS ENDPOINTS

(75) Inventors: William Howard Chriss, Holmdel, NJ (US); Michael Robert Lundberg, Holmdel, NJ (US); Shashank Sarwate, Ocean, NJ (US); Diane Somers, Holmdel, NJ (US); M. Umit Uyar, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 867 days.

(21) Appl. No.: 11/176,816

(22) Filed: Jul. 7, 2005

(65) Prior Publication Data

US 2007/0011484 A1  Jan. 11, 2007

(51) Int. Cl.
*H04M 1/24* (2006.01)
*H04M 3/08* (2006.01)
*H04M 3/22* (2006.01)

(52) U.S. Cl. ............... 379/10.02; 379/1.01; 379/15.01; 379/27.04

(58) Field of Classification Search ............... 379/1.01, 379/9, 10.01, 10.03, 26.01, 27.04, 27.07, 379/10.02, 12, 15.01–15.03, 27.02, 29.01, 379/29.02, 112.01, 112.05, 221.01; 370/241, 370/250

See application file for complete search history.

(56) References Cited

U.S. PATENT DOCUMENTS

| | | | |
|---|---|---|---|
| 5,987,110 A * | 11/1999 | Malik et al. | 379/196 |
| 6,173,244 B1 | 1/2001 | Pyritz | |
| 6,526,124 B1 | 2/2003 | Swahn et al. | |
| 7,016,475 B2 * | 3/2006 | Resuta | 379/29.02 |
| 7,388,946 B1 * | 6/2008 | Mussman et al. | 379/15.01 |
| 2004/0003070 A1 * | 1/2004 | Fernald et al. | 709/223 |
| 2006/0188080 A1 * | 8/2006 | Terpstra et al. | 379/211.02 |

\* cited by examiner

*Primary Examiner*—Quoc D Tran
(74) *Attorney, Agent, or Firm*—DeMont & Breyer, LLC

(57) ABSTRACT

A method and apparatus are disclosed that provide a technique for testing a data-processing system that enables communications between two or more telecommunications endpoints. An example of such a data-processing system is a Session-Initiation Protocol (SIP) proxy server. In particular, a test-execution system, in accordance with the illustrative embodiment of the present invention, transmits test-related signals to and receives test-related signals from one or more endpoints, such as SIP-enabled telephones. Some of the transmitted test-related signals direct an endpoint to transmit a message, such as a session-initiation request, to the data-processing system under test. Some of the received test-related signals comprise information from an endpoint, such as whether or not a message has been received from the data-processing system under test. Instead of communicating with the data-processing system itself, the test-execution system of the illustrative embodiment enlists the telecommunications endpoints to interact with the data-processing system.

20 Claims, 11 Drawing Sheets

TESTING A DATA-PROCESSING SYSTEM WITH TELECOMMUNICATIONS ENDPOINTS

FIELD OF THE INVENTION

The present invention relates to telecommunications in general, and, more particularly, to testing a data-processing system by using one or more associated telecommunications endpoints.

BACKGROUND OF THE INVENTION

FIG. 1 depicts telecommunications system 100 in the prior art. Telecommunications system 100 comprises telecommunications endpoints 101-1 through 101-M, wherein M is a positive integer; data-processing system 102; telecommunications network 103; and test-execution system 104, interconnected as shown.

Telecommunications endpoint 101-m, wherein m has a value between 1 and M, inclusive, is a device that is capable of enabling its user to communicate with one or more other users of endpoints in telecommunications system 100. For example, endpoint 101-1 is a telephone and can initiate a session with telephone endpoint 101-2 by using the Session Initiation Protocol (or "SIP"). In addition to initiating the session with endpoint 101-2, endpoint 101-1 might also initiate a session with a third endpoint, endpoint 101-3, in order to form a three-party conference call with endpoints 101-2 and 101-3.

Endpoint 101-m is also capable of receiving and transmitting test-related signals. One test-related signal might direct endpoint 101-m to perform a specific function. For example, endpoint 101-1 might receive a signal to dial a telephone number for initiating a session with endpoint 101-2. Another test-related signal might carry information to be used for generating a test result. For example, endpoint 101-2 might transmit a signal that indicates endpoint 101-1 is requesting the initiation of a session. Various equipment providers (e.g., Avaya, etc.) offer endpoints that are capable of handling test-related signals.

Data-processing system 102 is device that is capable of enabling communications, such as by setting up a call or a session, between one or more endpoints 101-1 through 101-M. In particular, data-processing system 102, acting as a proxy server, enables the initiation of a data exchange between two or more endpoints. During the initiation of a session, for example, data-processing system 102 receives messages from one or more endpoints and, as a proxy, acts on the received messages.

Telecommunications network 103 enables that sharing of data between devices that are connected to the network. For example, network 103 might comprise a local area network, such as the Ethernet. Similarly, network 103 might comprise a wide-area network where the endpoints are located miles apart. In telecommunications system 100, those connected devices include endpoints 101-1 through 101-M and data-processing system 103.

Test-execution system 104 is a device that is capable of executing test sequences for testing data-processing system 102. Test-execution system 104 communicates directly with data-processing system 102 by exchanging test-related signals in the course of testing data-processing system 102. In some test configurations, test-execution system 104 can also communicate with one or more endpoints 101-1 through 101-M, either through telecommunications network 103 or through direct pathways to the endpoints.

The problem with test-execution system 104 communicating directly with data-processing system 102 for the purpose of testing system 102 is that the very test signals that test-execution system 104 transmits to system 102 can potentially alter system 102's operational performance and perturb the results of one or more tests. Consider that in a true operating environment, data-processing system 102 interacts with one or more endpoints 101-1 through 101-M and not with test-execution system 104. Direct communication between systems 102 and 104 might have the effect of causing a particular test sequence to pass when, in fact, the sequence would have normally failed, or vice-versa. Moreover, it might not even be feasible for test-execution system 104 to be interfaced to data-processing system 102. For example, test-execution system 104 might have been designed by a first vendor (e.g., Avaya, etc.) to operate in accordance with a first protocol, while data-processing system 102 might have been designed by a second vendor (e.g., Cisco Systems, etc.) to operate in accordance with a second protocol that might be incompatible with the first. The second protocol might be incompatible with the first protocol due to, for example, different specification options implemented in the two systems. Therefore, a compatibility issue might exist between data-processing system 102 and test-execution system 104.

What is needed is a technique for testing a data-processing system, such as system 102, without some of the disadvantages in the prior art.

SUMMARY OF THE INVENTION

The present invention provides a technique, without some of the disadvantages in the prior art, for testing a data-processing system that enables communications between two or more telecommunications endpoints. An example of such a data-processing system under test is a Session_Initiation Protocol (SIP) proxy server that handles the signaling protocol of Voice over Internet Protocol (VoIP) telephony. In particular, a test-execution system, in accordance with the illustrative embodiment of the present invention, transmits test-related signals to and receives test-related signals from one or more endpoints, such as SIP-enabled telephones. Some of the transmitted, test-related signals command an endpoint to transmit a message, such as a session-initiation request, to the data-processing system under test. Some of the received test-related signals comprise information from an endpoint, such as whether or not a message has been received from the data-processing system under test. Instead of communicating with the data-processing system itself, the test-execution system of the illustrative embodiment enlists the telecommunications endpoints to interact with the data-processing system. In the SIP proxy server example, having the endpoints interact with the data-processing system serves to mimic realistically a live operating environment in the initiating of sessions, the setting up and controlling of calls, and so forth.

The test-execution system of the illustrative embodiments interfaces with the telecommunications endpoints via a telecommunications network, such as a local area Ethernet network. The test-execution system communicates with the endpoints via a mutually-understood protocol and in accordance with the illustrative embodiment. The endpoints communicate with each other and with the data-processing system via the Session Initiation Protocol in accordance with the illustrative embodiment; however, it will be clear to those skilled in the art that other protocols can be used, such as H.323 and so forth.

The control of the test-execution system's transmitting and receiving of test-related signals is based on generated test sequences and the test instructions that make up each test sequence. The test-execution system executes one or more instructions to transmit at least one test-related signal to an endpoint or to receive at least one test-related signal from an endpoint, alone or in combination. A first category of exchanged test-related signals is based on the test-execution system transmitting a command to an endpoint and then receiving a response from an endpoint, wherein the response is based on the command. A second category is based on the test-execution system receiving a status-related signal from an endpoint, then transmitting a command-related signal to an endpoint, and then receiving another status-related signal from an endpoint. The test result is then based on the combinations of the transmitted and received signals, as well as possibly on other aspects of the corresponding test sequence. In accordance with the illustrative embodiment, multiple test results can be generated from tests that execute sequentially or in parallel.

While interacting with the telecommunications endpoints to issue test-related commands or receive test-related outcomes, the test-execution system of the illustrative embodiment advantageously bypasses the data-processing system under test. Specifically, the transmission paths of the test-related signals avoid the data-processing system. The test-execution system of the illustrative embodiment is advantageous over some systems in the prior art because only the endpoints—and not the test-execution system—interact directly with the data-processing system. As a result, the operation of the data-processing system is tested more effectively and under more realistic conditions, while minimizing any intrusive effects that the test-execution system might have on the data-processing system. Furthermore, the test-execution system needs only to be directly compatible with one or more of the endpoints and not with the data-processing system, a merit that can be valuable in the testing of a mixed-vendor telecommunications system.

The illustrative embodiment of the present invention comprises: transmitting a first signal to a first endpoint that is able to communicate with a data-processing system; receiving a second signal from a second endpoint that is able to communicate with the data-processing system; and generating a first test result, based on the first signal and the second signal; wherein the data-processing system enables communications between the first endpoint and the second endpoint.

DETAILED DESCRIPTION

The term that appears below is given the following definition for use in this Description and the appended Claims.

For the purposes of the specification and claims, the term "endpoint" is defined as a device, such as a telecommunications terminal, that is capable of enabling its user to communicate with the users of one or more other terminals (i.e., endpoints). An endpoint can call another endpoint and can receive a call initiated from another endpoint. It transmits or receives, or both, an information stream that is exchanged with one or more other endpoints, where the information stream comprises one or more of voice, data, video, audio, text, and so forth. As described in this specification, an endpoint is also capable of exchanging test-related information with a test-execution system. Examples of endpoints comprise Session-Initiation Protocol (SIP) terminals, H.323 terminals, Voice over Internet Protocol (VoIP) terminals, Integrated Services Digital Network (ISDN) terminals, Plain Old Telephone Service (POTS) terminals, and so forth.

Figure 1:
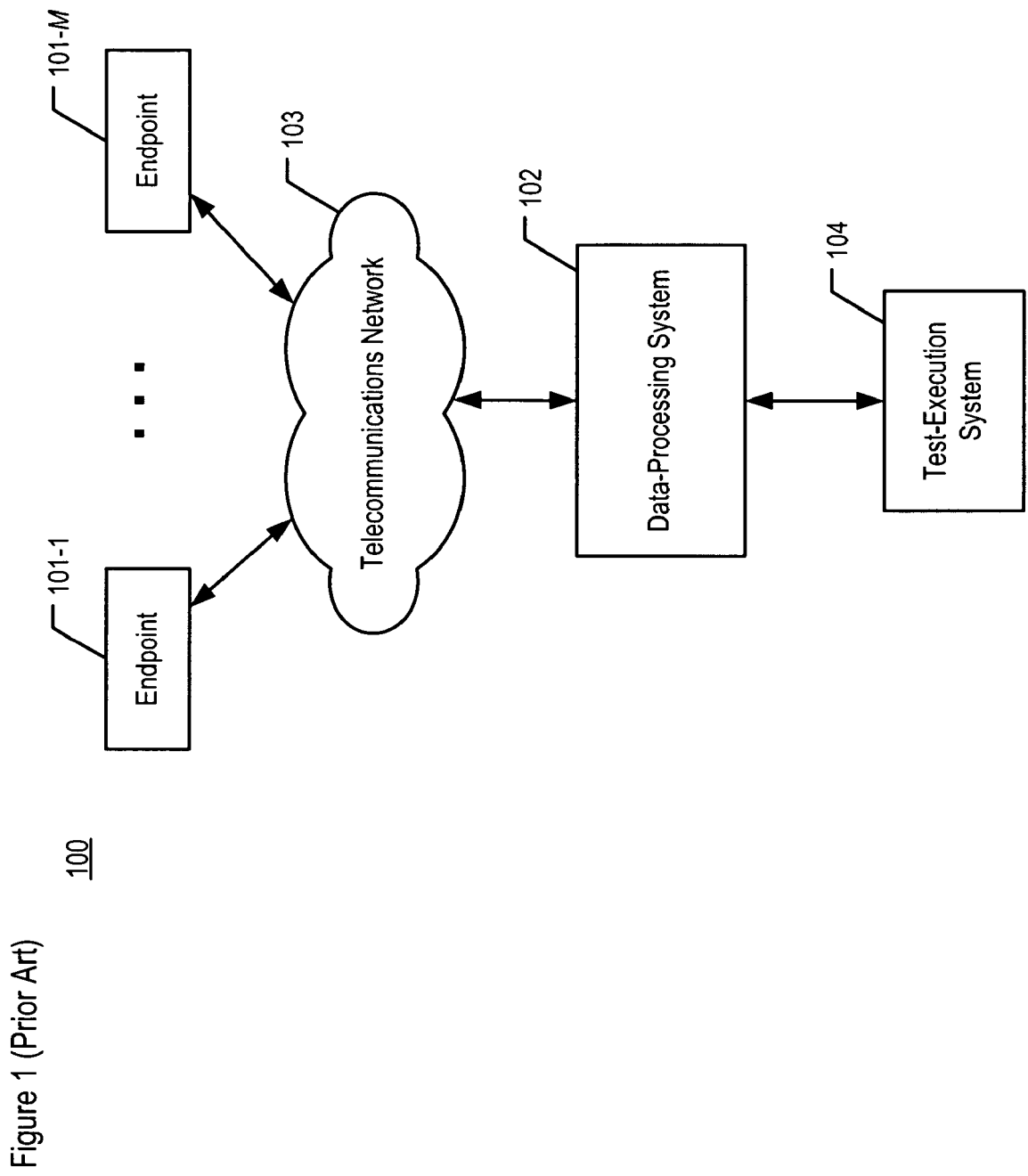
FIG. 1 depicts telecommunications system 100 in prior art.
Figure 2:
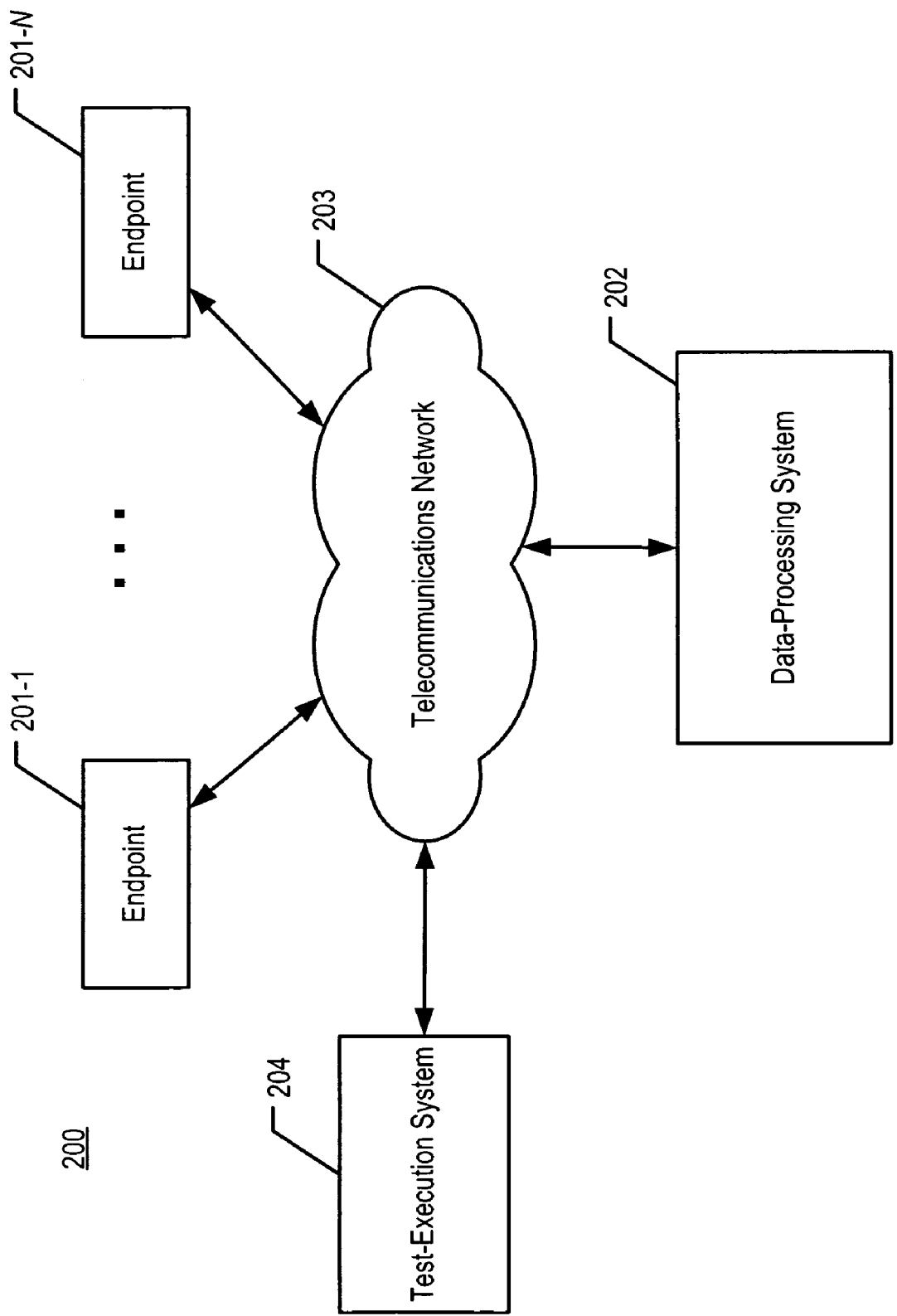
FIG. 2 depicts telecommunications system 200 in accordance with the illustrative embodiment of the present invention.

FIG. 2 depicts telecommunications system 200 in accordance with the illustrative embodiment of the present invention. Telecommunications system 200 comprises telecommunications endpoints 201-1 through 201-N, wherein N is a positive integer; data-processing system 202; telecommunications network 203; and test-execution system 204, interconnected as shown.

Telecommunications endpoint 201-n, wherein n is a value between 1 and N, inclusive, is a device that is capable of enabling its user to communicate with and to control communications with one or more other users of endpoints in telecommunications system 200, in accordance with the illustrative embodiment. Among other uses, endpoint 201-n can be used to call, conference in, transfer to, or message another endpoint or endpoints. For example, endpoint 201-1 is capable of initiating a session with endpoint 201-2 and might do so by using the Session Initiation Protocol (or "SIP"). Endpoint 201-1 might then also initiate a session with a third endpoint, endpoint 201-3, to form a three-party conference call with endpoint 201-3 from the session-in-progress with endpoint 201-2.

Although endpoint 201-n in the illustrative embodiment is a telecommunications terminal that is capable of enabling its user to communicate with other telecommunications terminal users, it will be clear to those skilled in the art how to make and use one or more of endpoints 201-1 through 201-N that are intended for other purposes.

Endpoint 201-n is also capable of exchanging test-related signals with test-execution system 204. One test-related signal might direct endpoint 201-n to perform a specific function. For example, endpoint 201-1 might receive from test-execution system 204 a signal to create the effect of pushing buttons on endpoint 201-1, which in turn causes endpoint 201-1 to dial a telephone number for initiating a session with endpoint 201-2. Another test-related signal might carry information to be used for generating a test result. For example, endpoint 201-2 might transmit a signal to test-execution system 204 that indicates endpoint 201-1 is requesting the initiation of a session. Endpoint 201-n decodes the received signals from test-execution system 204 into information that it can act on and encodes information for transmission, in well-known fashion. In accordance with the illustrative embodiment, endpoint 201-n exchanges test-related information with system 204 via network 203 and by using the same physical interface that endpoint 201-n uses to communicate with other endpoints. In some alternative embodiments, endpoint 201-n exchanges test-related information with system 204 by using a different physical interface, for example an RS-232 interface, as is known in the art.

It will be clear to those who are skilled in the art how to make and use endpoint 201-n.

Data-processing system 202 is device that enables communication, such as by setting up a call or initiating a session, between one or more endpoints 201-1 through 201-N, in well-known fashion. In accordance with the illustrative embodiment of the present invention data-processing system 202 comprises a Session-Initiation Protocol (SIP) proxy server, as is known in the art, for enabling Voice over Internet Protocol (VoIP) telephony between endpoints. As a SIP proxy, data-processing system 202 coordinates the initiation of a data exchange between two or more endpoints. During the initiation of a session, for example, data-processing system 202 receives messages from one or more endpoints and acts on the received messages, in well-known fashion. It will be clear to those who are skilled in the art how to make and use data-processing system 202.

Although data-processing system 202 in the illustrative embodiment is a SIP proxy, it will be clear to those skilled in the art how to make and use data-processing system 202 for a purpose other than serving as a SIP-based proxy. For example, system 202, in some alternative embodiments, can be an H.323-based proxy, a redirect server, a gateway, another endpoint, and so forth.

Telecommunications network 203 is a system that enables that sharing of data, in well-known fashion, among devices that are connected to the network. In telecommunications system 200, those connected devices include endpoints 201-1 through 201-N, data-processing system 203, and test-execution system 204. In accordance with the illustrative embodiment, telecommunications network 203 is a local-area, Ethernet-based network, as is well-known in the art. As those who are skilled in the art will appreciate, in some alternative embodiments telecommunications network 203 can be another type of network or might comprise multiple networks that are based on one or more protocols. It will be clear to those who are skilled in the art how to make and use telecommunications network 203.

Test-execution system 204 is a testing device (also known as an "engine") that is capable of generating and executing test sequences for testing data-processing system 202, in accordance with the illustrative embodiment of the present invention. For example, test-execution system 204 might be a desktop computer that is configured to generate and run test sequences. Test-execution system 204's structure is described below and with respect to FIG. 3. In some embodiments, test-execution system 204 is also capable of testing one or more of endpoints 201-1 through 201-N.

Test-execution system 204 exchanges signals, such as test messages, with endpoints 201-1 through 201-N via telecommunications network 203, in accordance with the illustrative embodiment. In some alternative embodiments, test-execution system 204 is connected to each of endpoints 201-1 through 201-N through pathways that are separate from telecommunications network 203. For example, in some of those alternative embodiments, test-execution system 204 can be connected to each endpoint via an RS-232 interface, as is well-known in the art, with one or more intermediary devices in each pathway that convert the RS-232-based signals into signals that can be acted upon (e.g., a command to dial a telephone number, etc.).

Figure 3:
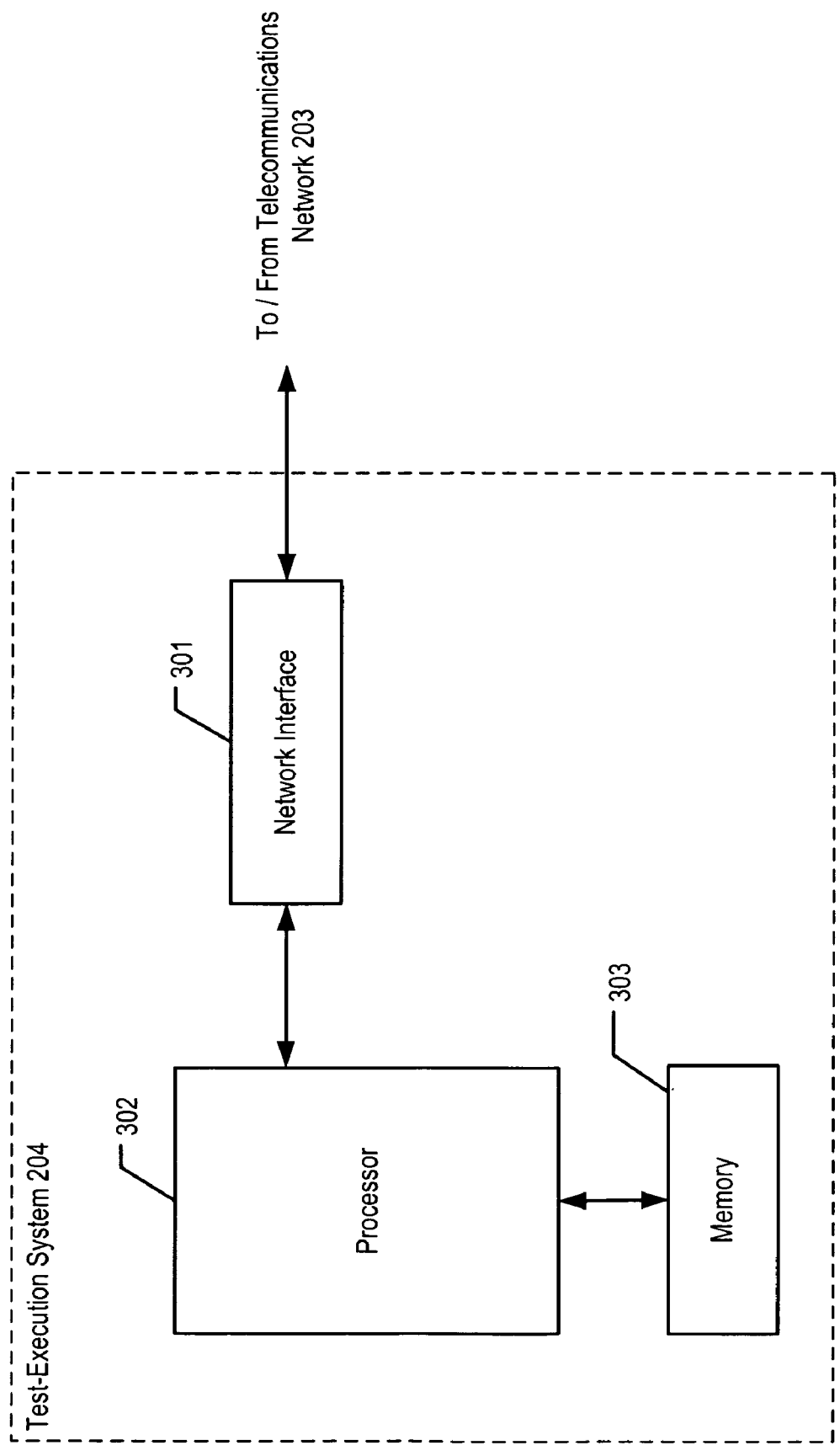
FIG. 3 depicts test-execution system 204, in accordance with the illustrative embodiment of the present invention.

FIG. 3 depicts test-execution system 204, in accordance with the illustrative embodiment of the present invention. Test-execution system 204 (or "system 204") comprises network interface 301, processor 302, and memory 303, interconnected as shown.

Network interface 301 comprises a receiving part and a transmitting part. The receiving part receives signals from telecommunications network 203, and forwards the information encoded in the signals to processor 302, in well-known fashion. The transmitting part receives information from processor 302, and outputs signals that encode this information to telecommunications network 203, in well-known fashion. It will be clear to those skilled in the art how to make and use network interface 301.

Processor 302 is a general-purpose processor whose capabilities comprise: (i) receiving information from network interface 301, (ii) reading data from and writing data into memory 303, (iii) executing the tasks described below and with respect to FIGS. 5 and 10, and (iv) transmitting information to network interface 301. In some alternative embodiments of the present invention, processor 302 might be a special-purpose processor. In either case, it will be clear to those skilled in the art, after reading this disclosure, how to make and use processor 302.

Memory 303 stores data and executable instructions, in well-known fashion, and is a combination of volatile and non-volatile memory. It will be clear to those skilled in the art how to make and use memory 303.

Figure 4:
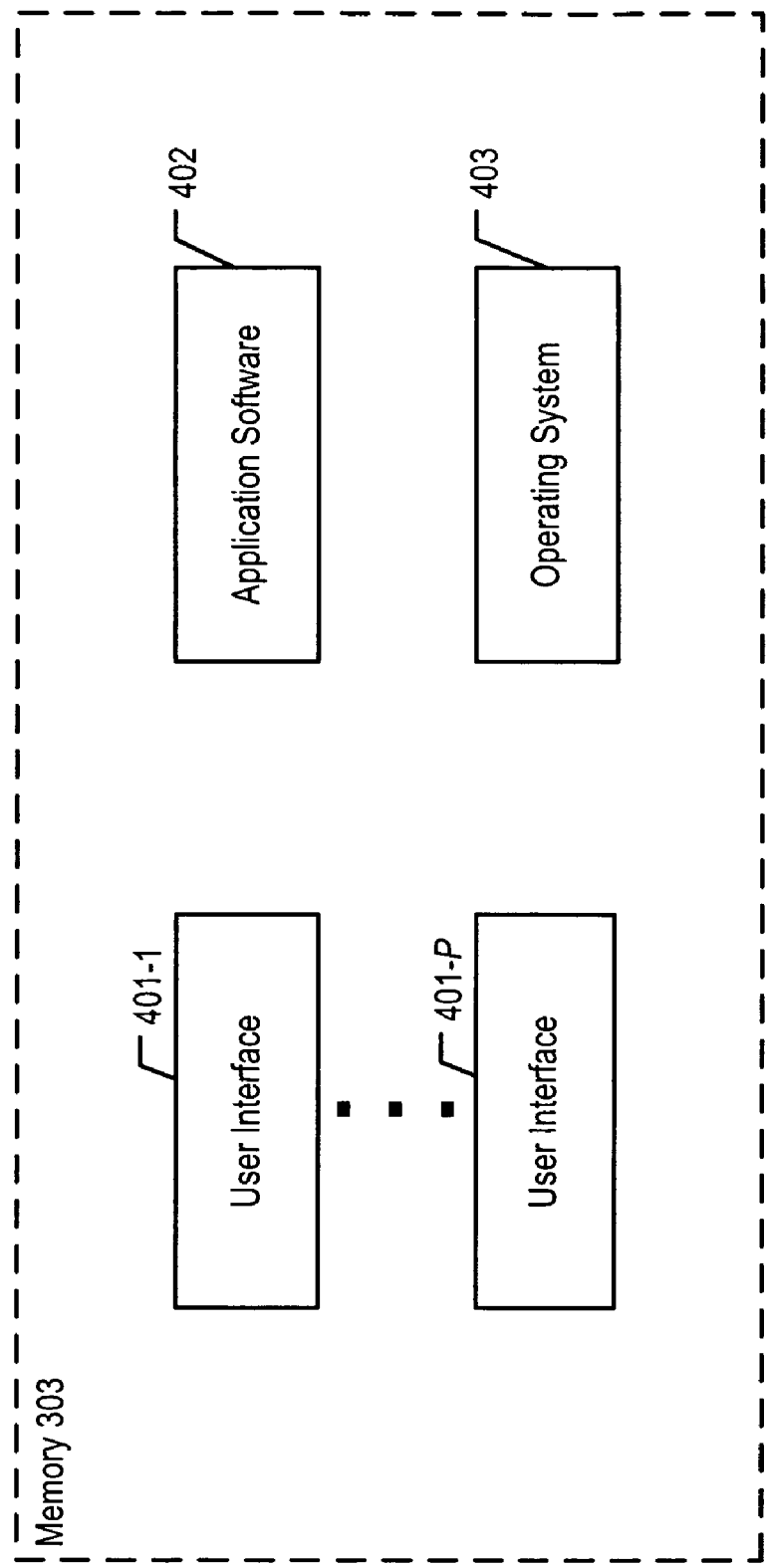
FIG. 4 depicts a block diagram of how information is stored and organized in memory 303 of endpoint 201-n, in accordance with the illustrative embodiment of the present invention.

FIG. 4 depicts a block diagram of how information is stored and organized in memory 303 of endpoint 201-n, in accordance with the illustrative embodiment of the present invention. The information stored in memory 303 comprises: user interface 401-1 through 401-P, wherein P is a positive integer that is less than or equal to N; application software 402; and operating system 403. As will be appreciated by those skilled in the art, the information that is stored in memory 303 can be organized differently than what is depicted in FIG. 4.

User interface 401-p, wherein p is a value between 1 and P inclusive, constitutes a test agent that emulates user $U_p$ who is associated with endpoint 201-p. User interface 401-p comprises one or more instructions that control the transmitting of signals to endpoint 201-p and the receiving of signals from endpoint 201-p. User interface 401-p is created as part of one or more test sequences. For example, if a generated test sequence specifies that endpoint 201-1 shall initiate a session with another endpoint as part of simulating user $U_1$ calling another user, then user interface 401-1 comprises the instruction to transmit a directing signal to endpoint 201-1 to initiate the session.

Application software 402 is the software portion of the system described below and with respect to FIGS. 5 and 10.

Operating system 403 is an operating system that performs input/output, file and memory management, and all of the other functions normally associated with operating systems, in well-known fashion. It will be clear to those skilled in the art how to make and use operating system 403.

FIGS. 5 through 11 depict a series of flowcharts and illustrative message-flow diagrams that are associated with testing data-processing system 202, in accordance with the illustrative embodiment of the present invention. The message-flow diagrams that are depicted in FIGS. 6, 7, 8, 9, and 11 illustrate various message-flow segments of a three-way conference call initiation, in which data-processing system 202 acts as the proxy server to the three endpoints involved in the conference call. The message-flow diagrams serve to provide examples of the test sequences and test-related signals that appear in the tasks described with respect to the flowcharts in FIGS. 5 and 10. Although a three-way conference call scenario is used as an illustrative category of tests, it will be clear to those who are skilled in the art how to make and use test-execution system 204 for testing with other call scenarios in mind.

Figure 5:
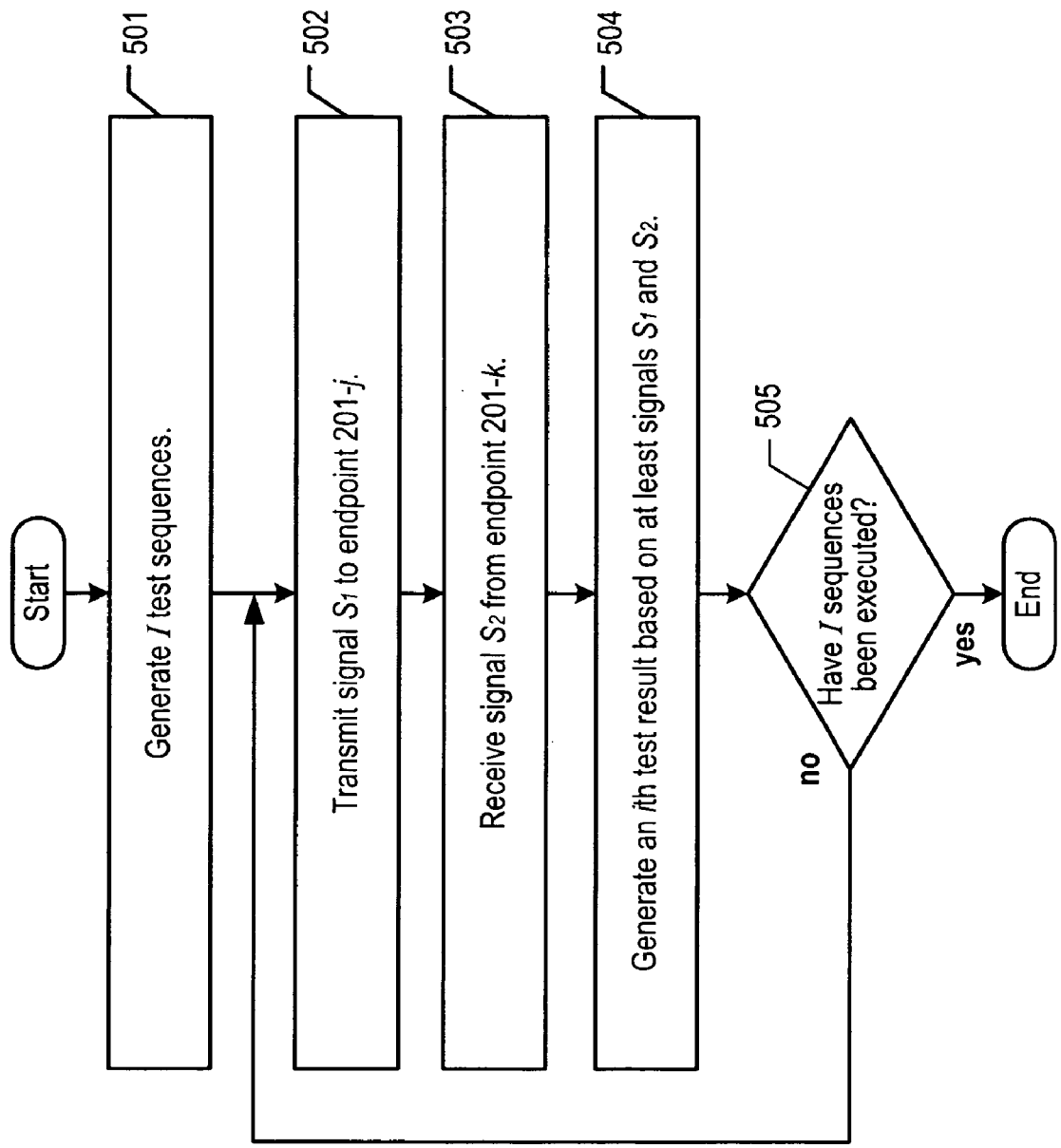
FIG. 5 depicts a first flowchart of the salient events associated with testing data-processing system 202, in accordance with the illustrative embodiment of the present invention.

FIG. 5 depicts a first flowchart of the salient tasks associated with testing data-processing system 202, in accordance with the illustrative embodiment of the present invention. In this message flow, test-execution system 204 transmits a signal to endpoint 201-j and then reacts to subsequent events. This is in contrast to the message flow depicted in FIG. 10, in which test-execution system 204 receives a signal from endpoint 201-j and then reacts. It will be clear to those skilled in the art which events depicted in FIG. 5 can occur simultaneously or in a different order than that depicted.

At task 501, system 204 generates I test sequences, wherein I is a positive integer, for testing data-processing system 202 and, optionally, one or more of endpoints 201-1 through 201-N, in accordance with the illustrative embodiment of the present invention. A test sequence comprises P sets of instructions, one set for each user interface 401-p, that are executed as part of the corresponding test. Note that the number of user interfaces P might vary from one test sequence to another. Some of the instructions translate to signals, such as those that convey commands (e.g., push a sequence of buttons, etc.), which are to be transmitted by user interfaces to the corresponding endpoints. Some other instructions translate to waiting intervals for signals that are to be received by user interfaces from the corresponding endpoints (e.g., expect a session request within five seconds, etc.). Still other instructions translate to actions that are to be taken in response to signals being received by user interfaces from the corresponding endpoints (e.g., answer call, etc.). It will be clear to those skilled in the art how to generate a test sequence.

In accordance with the illustrative embodiment, system 204 generates the test sequences. As those who are skilled in the art will appreciate, the test sequences can be generated elsewhere and then loaded into system 204 for testing purposes. For at least some of the test sequences, the generating of each test sequence assumes that the endpoints that are to be involved in the actual test operate correctly during the execution of the test sequence.

At task 502, system 204 transmits a first signal, signal $S_1$, to endpoint 201-j via user interface 401-j, wherein j is determined by the test sequence. For example, the first signal might convey a command (e.g., push buttons to dial, etc.) that directs endpoint 201-1 to transmit an INVITE request to data-processing system 202, per the Session-Initiation Protocol. The first signal bypasses data-processing system 202, in accordance with the illustrative embodiment.

At task 503, system 204 receives a second signal, signal $S_2$, from endpoint 201-k via user interface 401-k, wherein k is determined by the test sequence. For example, the second signal might indicate the arrival, at endpoint 201-2, of an INVITE request from data-processing system 202. The second signal bypasses data-processing system 202, in accordance with the illustrative embodiment.

Depending on the test sequence, system 204 might also transmit additional signals to one or more endpoints. System 204 might also receive additional signals from one or more endpoints. Furthermore, system 204 might transmit signals to and receive signals from the same endpoint.

At task 504, system 204 generates a test result based on one or more of the first signal, the second signal, and possibly other signals transmitted or received. In some embodiments, the test result is also based on other aspects of the corresponding test sequence (e.g., waiting intervals, etc.).

At task 505, system 204 determines if the generated I test sequences have been executed. If so, task execution ends. If not, task execution proceeds to task 502.

Figure 6:
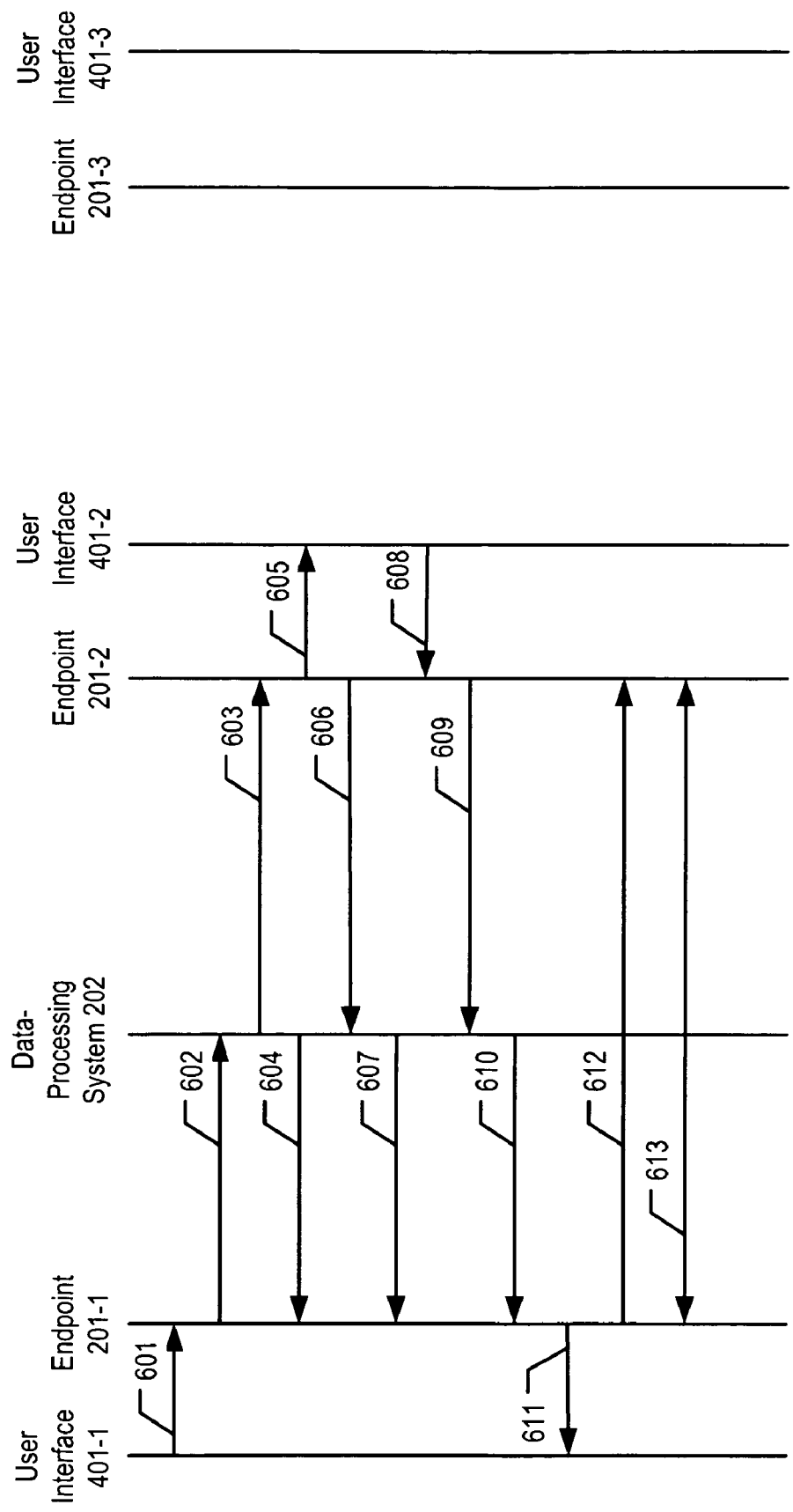
FIG. 6 depicts a message-flow diagram of a normal call flow between endpoints 201-1 and 201-2, as part of an attempt to initiate a three-way conference call between endpoints 201-1, 201-2, and 201-3.
Figure 7:
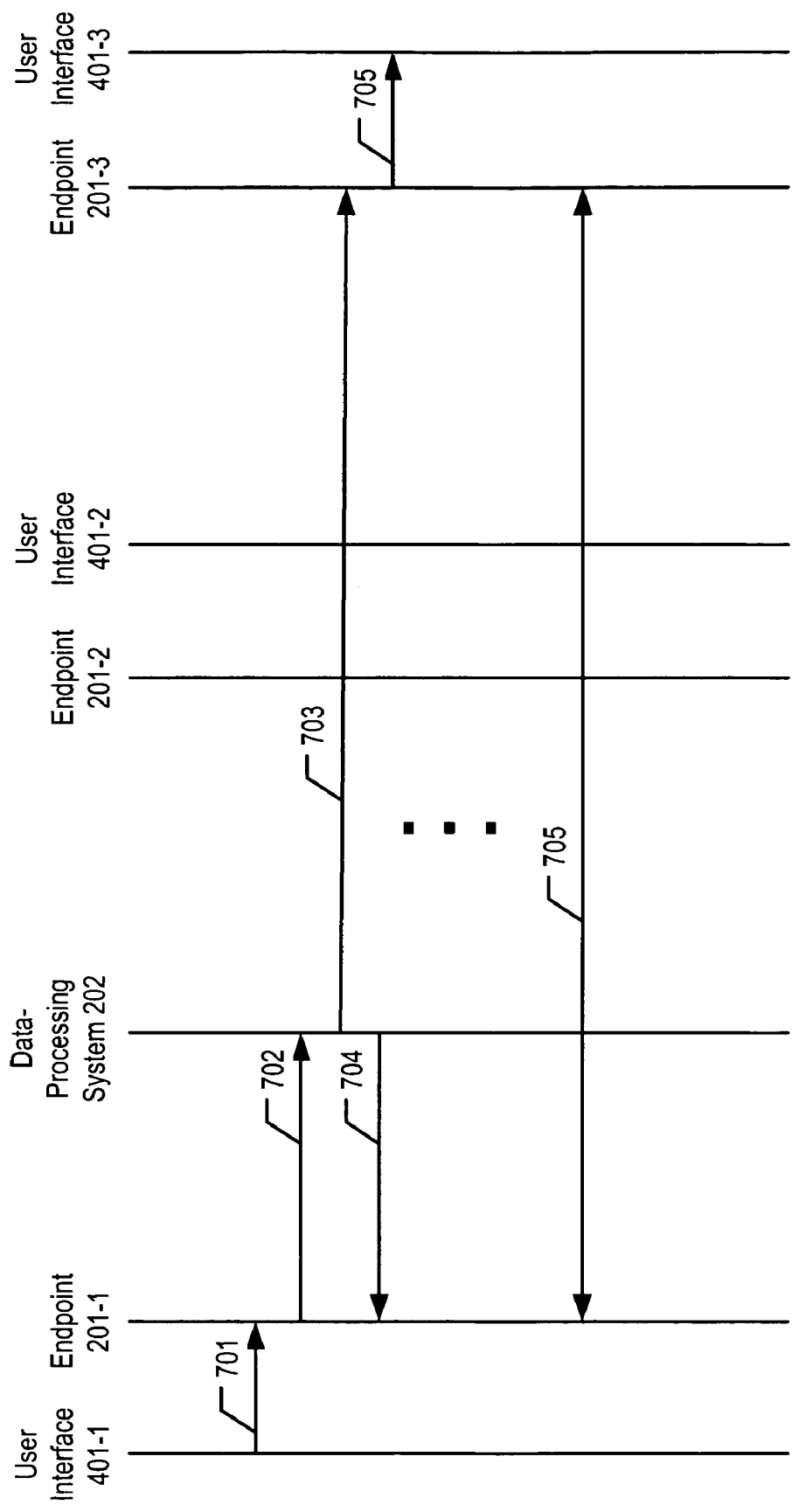
FIG. 7 depicts a message-flow diagram of a normal call flow between endpoints 201-1 and 201-3, as part of an attempt to initiate a three-way conference call between endpoints 201-1, 201-2, and 201-3.
Figure 8:
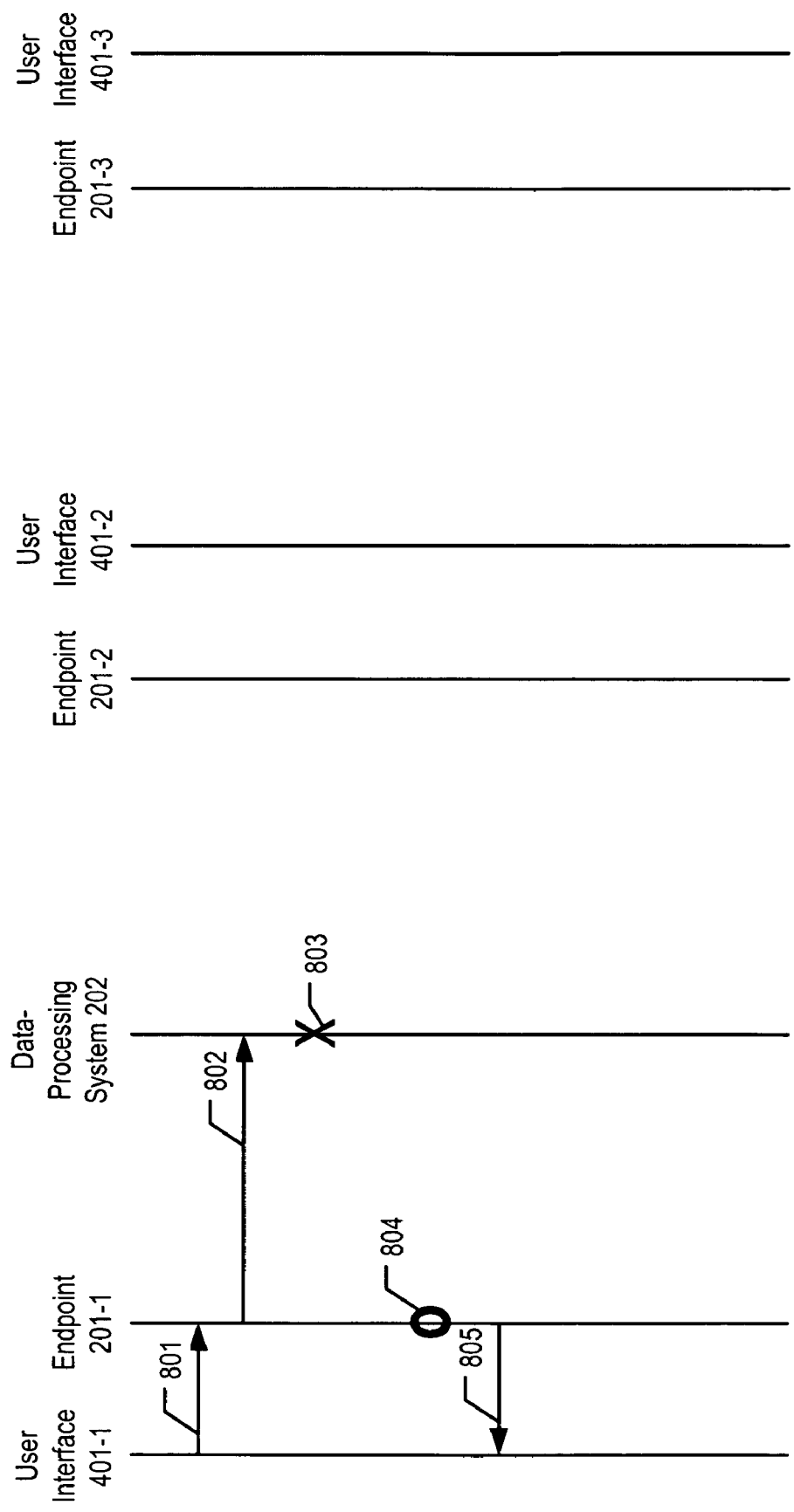
FIG. 8 depicts a message-flow diagram of a call flow between endpoints 201-1 and 201-2 with data-processing system 202 operating in error, as part of an attempt to initiate a three-way conference call between endpoints 201-1, 201-2, and 201-3.

FIGS. 6 through 8 depict a series of message-flow diagrams that illustrate an example of a three-way conference call initiation. In one possible call flow for initiating a three-way conference call, endpoint 201-1:

(i) initiates a session with 201-2, which is depicted in FIG. 6;
(ii) puts endpoint 201-2 on hold;
(iii) initiates a session with 201-3, which is depicted in FIG. 7; and
(iv) conferences endpoint 201-2 back into the session, an attempt of which is depicted in FIG. 8.

FIG. 6 depicts a message-flow diagram of a normal message flow between endpoints 201-1 and 201-2, in which endpoint 201-1 is attempting to initiate a session with endpoint 201-2, in accordance with the illustrative embodiment of the present invention. In this scenario, user interface 401-1 of test-execution system 204 initiates a session between endpoints 201-1 and 201-2 by using Session Initiation Protocol.

At event 601, user interface 401-1 transmits a signal to endpoint 201-1. The signal directs endpoint 201-1 to transmit an INVITE request to data-processing system 202.

At event 602, endpoint 201-1 transmits an INVITE request to data-processing system 202 in well-known fashion.

At event 603, data-processing system 202 transmits a corresponding INVITE message to endpoint 201-2 in well-known fashion. At event 604, data-processing system 202 also transmits a "Trying" response back to endpoint 201-1 in well-known fashion. As those who are skilled in the art will appreciate, endpoint 201-1 can then transmit a signal to user interface 401-1 of test-execution system 204, in which the signal indicates the arrival of the response.

At event 605, endpoint 201-2 transmits a signal to user interface 401-2 of test-execution system 204 that indicates the arrival of the INVITE request. At event 606, endpoint 201-2 also transmits a "Ringing" response back to data-processing system 202 in well-known fashion.

At event 607, data-processing system relays the "Ringing" response back to endpoint 201-1 in well-known fashion. As those who are skilled in the art will appreciate, endpoint 201-1 can then transmit a signal to user interface 401-1 of test-execution system 204, in which the signal indicates the arrival of the response.

Meanwhile, at event 608, user interface 401-2 of test-execution system 204 transmits a signal to endpoint 201-2 to answer the call. Note that the transmitting of the signal can be based on, for example: the received INVITE-related signal; the INVITE-related signal plus a time interval; the signal and interval plus another event related or unrelated to endpoints 201-1, 201-2, or 201-3; and so forth.

At event 609, endpoint 201-2 transmits an "OK" response back to data-processing system 202 in well-known fashion.

At event 610, data-processing system 202 relays the "OK" response back to endpoint 201-1 in well-known fashion.

At event 611, endpoint 201-1 transmits a signal to user interface 401-1 of test-execution system 204, in which the signal indicates the arrival of the "OK" response. As a result, at event 612, endpoint 201-1 transmits an ACK response to endpoint 201-2 in well-known fashion. Note that the ACK response, as well as possibly some other messages, does not have to traverse data-processing system 202 because endpoint 201-2 has provided its contact information to endpoint 201-1 in the "OK" response. As those who are skilled in the art will appreciate, endpoint 201-2 can then transmit a signal to user interface 401-2 of test-execution system 204, in which the signal indicates the arrival of the request.

At event 613, endpoints 201-1 and 201-2 exchange media that constitute data streams and as part of a session, in well-known fashion. As those who are skilled in the art will appreciate, endpoint 201-1 can transmit a signal to user interface 401-1 of test-execution system 204 and endpoint 201-2 can transmit a signal to user interface 401-2 of test-execution system 204, in which the signals provide information on the data streams.

Test-execution system 204 then uses one or more signals that are either received from or transmitted to endpoints 201-1 and 201-2 to generate one or more test results, as described with respect to task 503. For example, a test result that is based on the signals associated with events 601 and 605 might suggest that data-processing system 202 was able to handle properly an INVITE request from endpoint 201-1 to endpoint 201-2. As another example, a test result that is based on the signals associated with events 608 and 611 might suggest that data-processing system 202 was able to properly handle an "OK" response from endpoint 201-2 to endpoint 201-1.

Continuing with the illustrative three-way conference test scenario, endpoint 201-1 then puts endpoint 201-2 on hold in well-known fashion. As those who are skilled in the art will appreciate, user interfaces 401-1 and 401-2 can transmit and receive signals to control and monitor endpoints 201-1 and 201-2 for the purpose of generating one or more test results on data-processing system 202's performance while putting endpoint 201-2 on hold.

FIG. 7 depicts a message-flow diagram of a normal call flow between endpoints 201-1 and 201-3, in which endpoint 201-1 is attempting to initiate a session with endpoint 201-3, in accordance with the illustrative embodiment of the present invention. In this scenario, user interface 401-1 of test-execution system 204 initiates a session between endpoints 201-1 and 201-3 by using Session Initiation Protocol.

At event 701, user interface 401-1 transmits a signal to endpoint 201-1. The signal directs endpoint 201-1 to transmit an INVITE request to data-processing system 202.

At event 702, endpoint 201-1 transmits an INVITE request to data-processing system 202 in well-known fashion.

At event 703, data-processing system 202 transmits a corresponding INVITE message to endpoint 201-3 in well-known fashion. At event 704, data-processing system 202 also transmits a "Trying" response back to endpoint 201-1 in well-known fashion. As those who are skilled in the art will appreciate, endpoint 201-1 can then transmit a signal to user interface 401-1 of test-execution system 204, in which the signal indicates the arrival of the response.

At event 705, endpoint 201-3 transmits a signal to user interface 401-3 of test-execution system 204, in which the signal indicates the arrival of the request.

The scenario then progresses as described with respect to events 605 through 612 depicted in FIG. 6, with the difference that endpoint 201-3 and user interface 401-3 are used instead of endpoint 201-2 and user interface 401-2.

At event 705, endpoints 201-1 and 201-3 exchange media that constitute data streams and as part of a session, in well-known fashion. As those who are skilled in the art will appreciate, endpoint 201-1 can transmit a signal to user interface 401-1 of test-execution system 204 and endpoint 201-3 can transmit a signal to user interface 401-3 of test-execution system 204, in which the signals provide information on the data streams.

Test-execution system 204 then uses one or more signals that are either received from or transmitted to endpoints 201-1 and 201-3 to generate one or more test results, as described with respect to task 507. For example, a test result that is based on the signals associated with events 701 and 705 might suggest that data-processing system 202 was able to handle properly an INVITE request from endpoint 201-1 to endpoint 201-3 (with endpoint 201-2 on hold).

FIG. 8 depicts a message-flow diagram of a call flow between endpoints 201-1 and 201-2 with data-processing system 202 operating in error, in accordance with the illustrative embodiment of the present invention. In this scenario, user interface 401-1 of test-execution system 204 directs endpoint 201-1 to request, by using Session Initiation Protocol, that endpoint 201-2 serve as a mixer of all of the data streams in the three-way conference call.

At event 801, user interface 401-1 transmits a signal to endpoint 201-1. The signal directs endpoint 201-1 to transmit an INVITE request to data-processing system 202 to complete the three-way conference call, specifying that endpoint 201-2 serve as a mixer of the data streams in the three-way conference call.

At event 802, endpoint 201-1 transmits an INVITE request to data-processing system 202 in well-known fashion.

At event 803, data-processing system 202 experiences an error condition and, consequently, is unable to act on the received INVITE request.

At event 804, endpoint 201-1 experiences a timeout as the result of not having received a "Trying" response from data-processing system 202. As a result, at event 805, endpoint 201-1 transmits a signal to user interface 401-1 to indicate that the timeout has occurred.

Test-execution system 204 then uses one or more signals that are either received from or transmitted to endpoints 201-1 and 201-2 to generate one or more test results, as described with respect to task 505. For example, a test result that is based on the signals associated with events 801 and 805 might suggest that data-processing system 202 was unable to handle properly an INVITE request from endpoint 201-1 to endpoint 201-2 for completing a three-way conference call.

Figure 9:
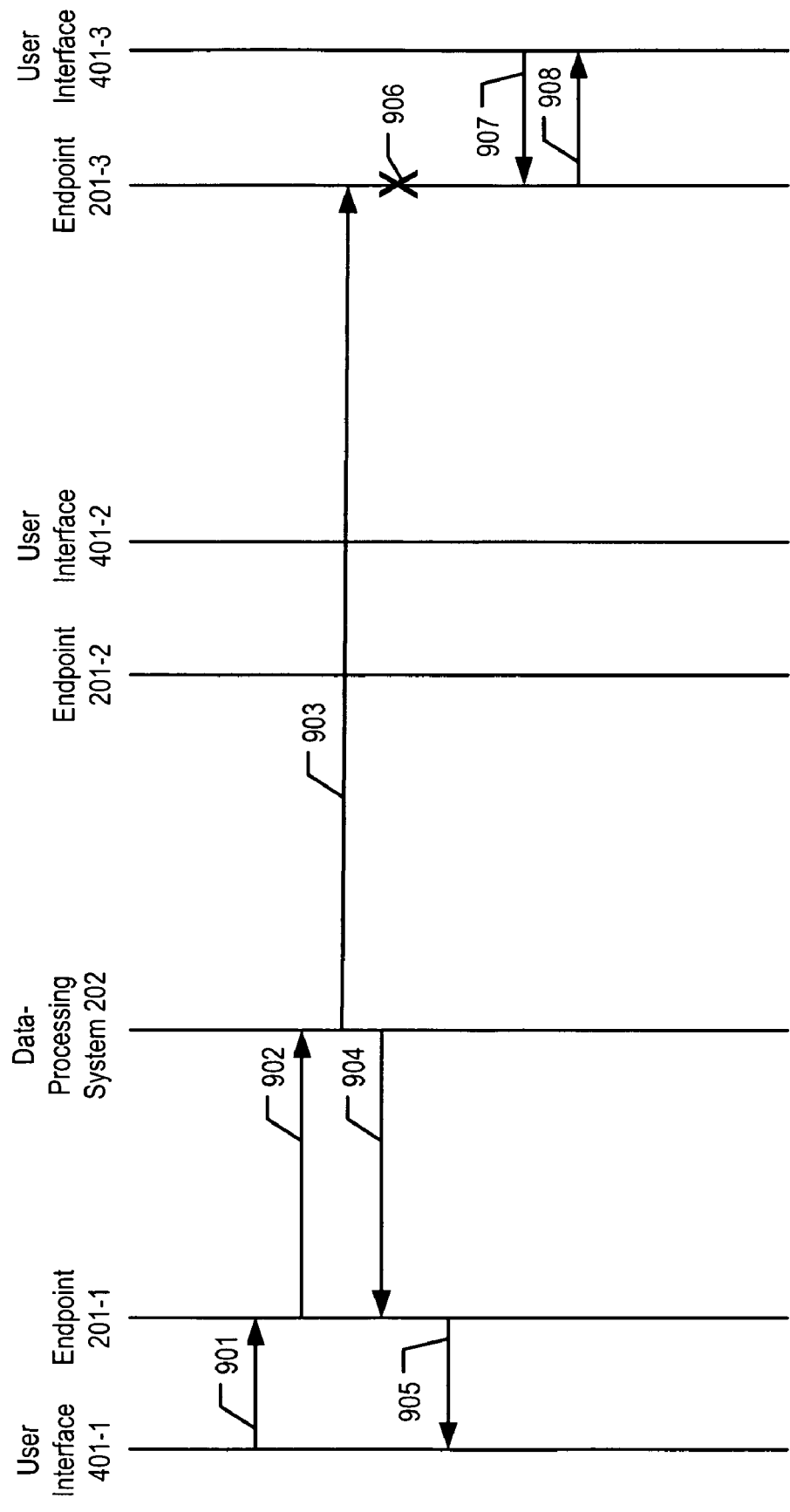
FIG. 9 depicts a message-flow diagram of a call flow between endpoints 201-1 and 201-3 with endpoint 201-3 operating in error.

Referring to FIG. 9, the technique provided in the illustrative embodiment of the present invention can also be used to generate one or more test results for an endpoint. FIG. 9 depicts a message-flow diagram of a call flow between endpoints 201-1 and 201-3 with endpoint 201-3 operating in error, in accordance with the illustrative embodiment of the present invention. This call flow, for example, might have occurred as part of the three-way conference call attempt described earlier. In this scenario, user interface 401-1 of test-execution system 204 initiates a session between endpoints 201-1 and 201-3 by using Session Initiation Protocol.

At event 901, user interface 401-1 transmits a signal to endpoint 201-1. The signal directs endpoint 201-1 to transmit an INVITE request to data-processing system 202.

At event 902, endpoint 201-1 transmits an INVITE request to data-processing system 202 in well-known fashion.

At event 903, data-processing system 202 transmits a corresponding INVITE message to endpoint 201-3 in well-known fashion. At event 904, data-processing system 202 also transmits a "Trying" response back to endpoint 201-1 in well-known fashion.

At event 905, endpoint 201-1 transmits a signal to user interface 401-1 to indicate that the "Trying" response was received by endpoint 201-1.

Meanwhile, at event 906, endpoint 201-3 experiences an error condition and, consequently, is unable to act on the received INVITE request.

Test-execution system 204 experiences a timeout because it did not receive, via user interface 401-1, an indication of a "Ringing" response from endpoint 201-1. As a result, at event 907, user interface 401-3 transmits a signal to endpoint 201-3 to request information that is to be used to generate a test result. The requested information, for example, might be a bitmap or other such representation of endpoint 201-3's display screen, or error codes that can be used for debugging purposes.

At event 908, endpoint 201-3 transmits a signal to user interface 401-3 that contains the requested information.

Test-execution system 204 then uses one or more signals that are either received from or transmitted to endpoints 201-1 and 201-3 to generate one or more test results, as described with respect to task 507. For example, a test result that is based on the signals associated with events 901 and 908 might suggest that endpoint 201-3 was unable to handle properly an INVITE request that was sent by endpoint 201-1 through data-processing system 202.

Figure 10:
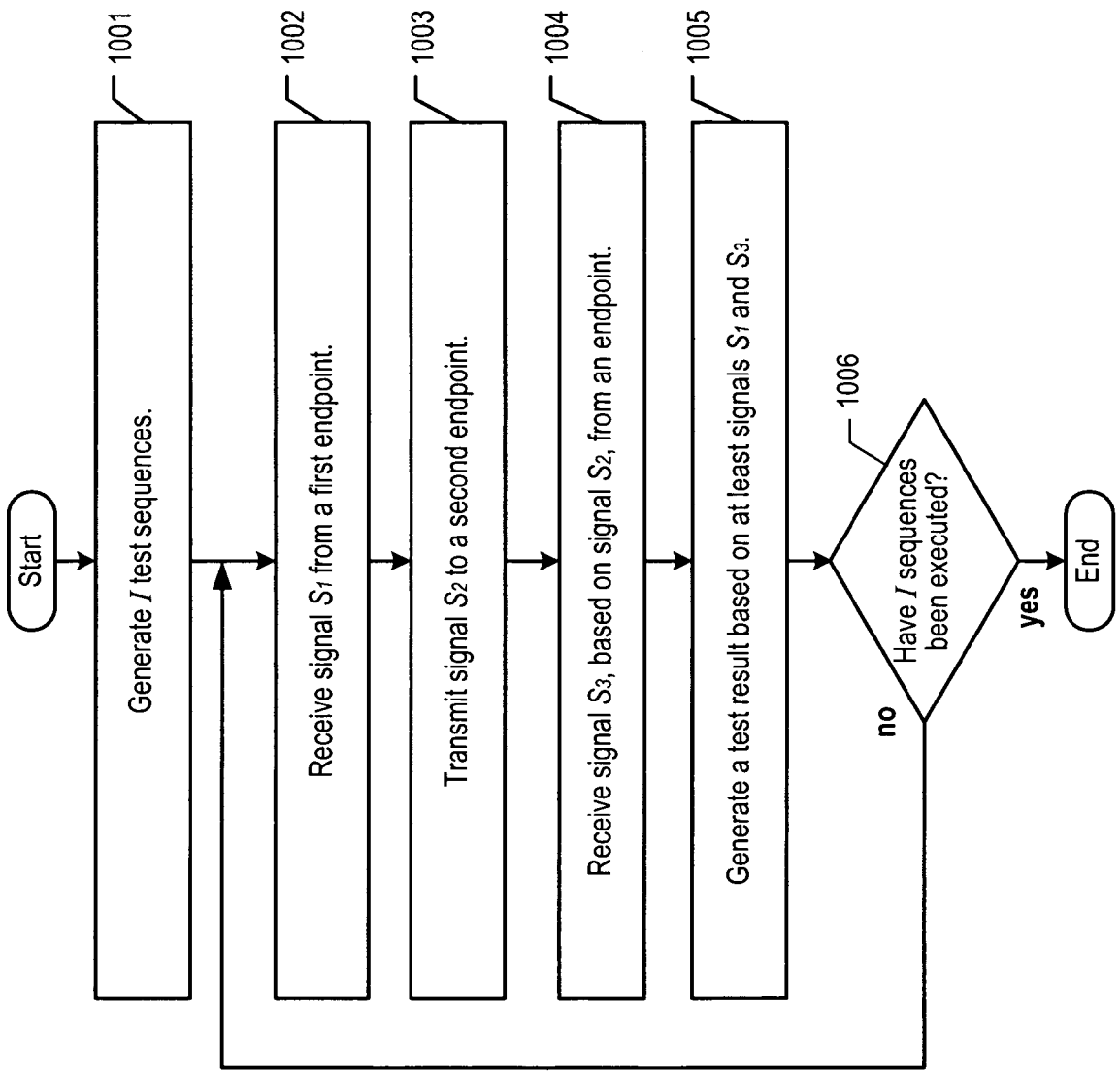
FIG. 10 depicts a second flowchart of the salient events associated with testing data-processing system 202, in accordance with the illustrative embodiment of the present invention.

FIG. 10 depicts a second flowchart of the salient tasks associated with testing data-processing system 202, in accordance with the illustrative embodiment of the present invention. In this message flow, test-execution system 204 receives a signal from endpoint 201-j and then reacts. This is in contrast to the message flow depicted in FIG. 5, in which test-execution system 204 transmits a signal to endpoint 201-j and then reacts to subsequent events. It will be clear to those skilled in the art which events depicted in FIG. 10 can occur simultaneously or in a different order than that depicted.

At task 1001, system 204 generates I test sequences, wherein I is a positive integer, for testing data-processing system 202 and, optionally, one or more of endpoints 201-1 through 201-N, in accordance with the illustrative embodiment of the present invention. It will be clear to those skilled in the art, after reading this disclosure, how to generate a test sequence.

In accordance with the illustrative embodiment, system 204 generates the test sequences. As those who are skilled in the art will appreciate, the test sequences can be generated elsewhere and then loaded into system 204 for testing purposes. Depending on the particular test sequence, the generating of that test sequence might or might not assume that the endpoints that are to be involved in the actual test operate correctly during the execution of the test sequence.

At task 1002, system 204 receives a first signal, signal $S_1$, from endpoint 201-j via user interface 401-j, wherein j is determined by the test sequence. For example, the first signal, received from endpoint 201-2, might indicate that endpoint 201-2 has received an INVITE request from endpoint 201-1. The first signal bypasses data-processing system 202, in accordance with the illustrative embodiment.

At task 1003, system 204 transmits a second signal, signal $S_2$, to endpoint 201-k via user interface 401-k, wherein k is determined by the test sequence. Depending on the test sequence, the second signal might be transmitted in response to having received the first signal. As a first example, the second signal might direct endpoint 201-2 to answer the incoming call. As a second example, the second signal might direct endpoint 201-1 to hang up before endpoint 201-2 has a chance to answer the call. As a third example, the second signal might direct one of the endpoints to transmit a representation (e.g., a bitmap image, etc.) of the endpoint's display to system 204. The second signal bypasses data-processing system 202, in accordance with the illustrative embodiment.

At task 1004, system 204 receives a third signal, signal $S_3$, from an endpoint. Depending on the test sequence, the third signal might be received in response to an event having been caused by the second signal. For example, the third signal might convey a retrieved bitmap image of an endpoint's display. The third signal bypasses data-processing system 202, in accordance with the illustrative embodiment.

Depending on the test sequence, system 204 might also transmit additional signals to one or more endpoints. System 204 might also receive additional signals from one or more endpoints. Furthermore, system 204 might transmit signals to and receive signals from the same endpoint.

At task 1005, system 204 generates a test result based on one or more of the first signal, second signal, third signal, and possibly other signals transmitted or received. In some embodiments, the test result is also based on other aspects of the corresponding test sequence (e.g., waiting intervals, etc.).

At task 1006, system 204 determines if the generated I test sequences have been executed. If so, task execution ends. If not, task execution proceeds to task 1002.

Figure 11:
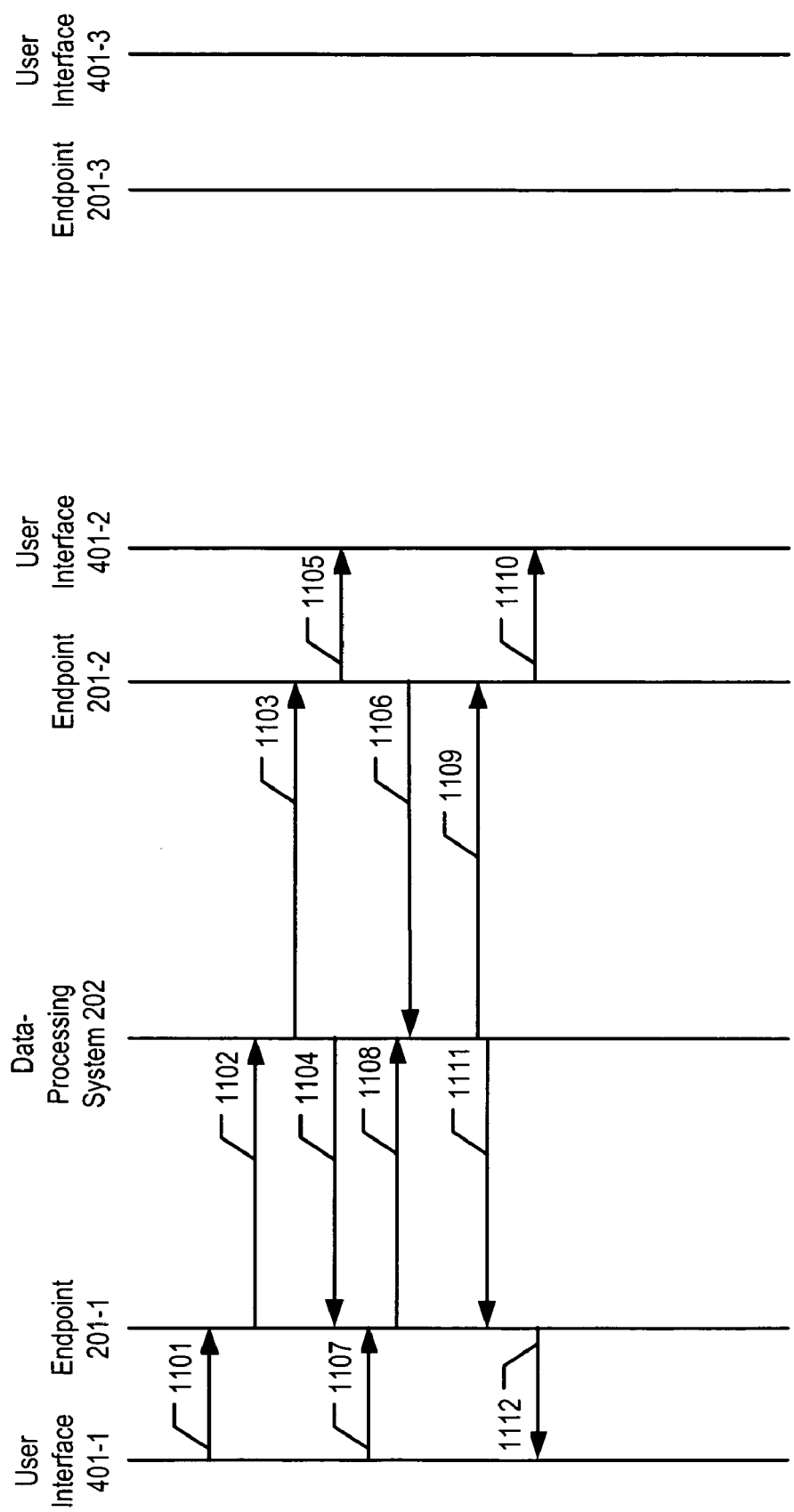
FIG. 11 depicts a message-flow diagram of a normal call flow between endpoints 201-1 and 201-2 with a spontaneous BYE request sent by endpoint 201-1.

FIG. 11 depicts a message-flow diagram of a normal call flow between endpoints 201-1 and 201-2 with a spontaneous BYE request sent by endpoint 201-1, in accordance with the illustrative embodiment of the present invention. In this scenario, user interface 401-1 of test-execution system 204 initiates a session between endpoints 201-1 and 201-2 by using Session Initiation Protocol.

At event 1101, user interface 401-1 transmits a signal to endpoint 201-1. The signal directs endpoint 201-1 to transmit an INVITE request to data-processing system 202.

At event 1102, endpoint 201-1 transmits an INVITE request to data-processing system 202 in well-known fashion.

At event 1103, data-processing system 202 transmits a corresponding INVITE message to endpoint 201-2 in well-known fashion. At event 1104, data-processing system 202 also transmits a "Trying" response back to endpoint 201-1 in well-known fashion. As those who are skilled in the art will appreciate, endpoint 201-1 can then transmit a signal to user interface 401-1 of test-execution system 204, in which the signal indicates the arrival of the response.

At event 1105, endpoint 201-2 transmits a signal to user interface 401-2 of test-execution system 204 that indicates the arrival of the INVITE request. In addition, at event 1106, endpoint 201-2 transmits a "Ringing" response to data-processing system 202 in well-known fashion.

Meanwhile, at event 1107, user interface 401-1 transmits a signal to endpoint 201-1. The signal directs endpoint 201-1 to transmit a BYE request to data-processing system 202 (i.e., by "pushing" the drop button of endpoint 201-1). The BYE request signifies that endpoint 201-1 is ending the session. Note that the transmitting of the signal can be based on, for example: the received "Trying" response signal; the response-related signal plus a time interval; the signal and interval plus another event related or unrelated to endpoints 201-1 or 201-2; the received INVITE-related signal (as part of event 1105); and so forth.

At event 1108, endpoint 201-1 transmits a BYE request to data-processing system 202 in well-known fashion.

At event 1109, data-processing system 202 transmits a corresponding BYE request to endpoint 201-2 in well-known fashion.

At event 1110, endpoint 201-2 transmits a signal to user interface 401-2 of test-execution system 204, in which the signal indicates the arrival of the request.

At event 1111, data-processing system 202 also transmits a "Trying" response back to endpoint 201-1 in well-known fashion.

At event 1112, endpoint 201-1 transmits a signal to user interface 401-1 of test-execution system 204, in which the signal indicates that endpoint 201-1 has received a "Trying" response.

Test-execution system 204 then uses one or more signals that are either received from or transmitted to endpoints 201-1 and 201-2 to generate one or more test results, as described with respect to task 1005 in FIG. 10. For example, a test result that is based on the signals associated with events 1105, 1107, 1110, and 1112 might suggest that data-processing system 202 was able to properly handle a BYE request from endpoint 201-1 while in the process of initiating a session.

The call flow that is represented in FIG. 11 might continue with additional messages that are not depicted being exchanged until the session has successfully ended. The additional messages are irrelevant, however, for the particular test sequence that is featured in the example illustrated in FIG. 11.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    transmitting, from a test-execution system, a first test-related signal to a first endpoint that is able to i) initiate a call to a second endpoint and ii) communicate a signal that is part of the call to the second endpoint via a data-processing system;
    receiving, at the test-execution system, a second test related signal from the second endpoint; and
    generating a first test result, based on the first test-related signal and the second test-related signal;
    wherein the first test-related signal and the second test-related signal bypass the data-processing system, and wherein the signal that is part of the call bypasses the test-execution system.

2. The method of claim 1 wherein the first test-related signal and the signal that is part of the call are handled via different physical interfaces at the first endpoint.

3. The method of claim 1 wherein the first test result is for the data-processing system.

4. The method of claim 1 further comprising generating a test sequence, wherein the generating of the test sequence assumes that the first endpoint and the second endpoint operate correctly during the execution of the test sequence; and
    wherein the generating of the first test result is also based on the test sequence.

5. The method of claim 1 further comprising generating a second test result for at least one of (i) the first endpoint and (ii) the second endpoint, wherein the second test result is based on the first test-related signal and the second test-related signal.

6. The method of claim 1 wherein the first test-related signal directs the first endpoint to transmit a message to the data-processing system in accordance with the Session Initiation Protocol.

7. The method of claim 6 wherein the message is to indicate that the first endpoint is calling the second endpoint.

8. A method comprising:
    receiving, at a test-execution system, a first test-related signal from a first endpoint that is able to i) receive a call initiated by a second endpoint and ii) communicate a signal that is part of the call to the second endpoint via a data-processing system;
    transmitting a second test-related signal at the test-execution system, based on the receiving of the first test-related signal, to the second endpoint;
    receiving a third test-related signal at the test-execution system, based on the second test-related signal; and
    generating a first test result based on the first test-related signal, the second test-related signal, and the third test-related signal;
    wherein the first test-related signal, the second test-related signal, and the third test-related signal bypass the data-processing system, and wherein the signal that is part of the call bypasses the test-execution system.

9. The method of claim 8 wherein the first test-related signal and the signal that is part of the call are handled via different physical interfaces at the first endpoint.

10. The method of claim 8 wherein the first test result is for the data-processing system.

11. The method of claim 8 further comprising generating a test sequence, wherein the generating of the test sequence assumes that the first endpoint and the second endpoint operate correctly during the execution of the test sequence; and
    wherein the generating of the first test result is also based on the test sequence.

12. The method of claim 8 further comprising generating a second test result for at least one of (i) the first endpoint and (ii) the second endpoint, wherein the second test result is based on the first test-related signal and the second test-related signal.

13. The method of claim 8 wherein the first test-related signal indicates an incoming call at the first endpoint.

14. The method of claim 8 wherein the second test-related signal directs the second endpoint to transmit a message to the data-processing system in accordance with the Session Initiation Protocol, wherein the message is to indicate that the second endpoint is calling a third endpoint.

15. A method comprising:
   transmitting, from a test-execution system, a first test-related signal that directs a first endpoint to call a second endpoint;
   receiving, at the test-execution system, a second test-related signal from the second endpoint that indicates a first call being received from the first endpoint; and
   generating a first test result for a data-processing system, based on the first test-related signal and the second test-related signal;
   wherein the data-processing system enables the setting up of the first call between the first endpoint and the second endpoint, wherein the first test-related signal and the second test-related signal bypass the data-processing system, and wherein the first call bypasses the test-execution system.

16. The method of claim 15 wherein the first test-related signal and the first call are handled via different physical interfaces at the first endpoint.

17. The method of claim 15 wherein the data-processing system is a Session Initiation Protocol proxy server.

18. The method of claim 15 further comprising generating a first test sequence, wherein the generating of the first test sequence assumes that the first endpoint and the second endpoint operate correctly during the execution of the first test sequence; and
   wherein the generating of the first test result is also based on the first test sequence.

19. The method of claim 15 further comprising
   transmitting a third test-related signal that directs the first endpoint to call a third endpoint;
   receiving a fourth test-related signal from the third endpoint that indicates a second call from the first endpoint; and
   generating a second test result for the data-processing system, based on the third signal and the fourth test-related signal;
   wherein the data-processing system enables the setting up of the second call between the first endpoint and the third endpoint,
   wherein the third test-related signal and the fourth test-related signal bypass the data-processing system.

20. The method of claim 19 further comprising generating a second test sequence, wherein the generating of the second test result is also based on the second test sequence.

* * * * *

UNITED STATES PATENT AND TRADEMARK OFFICE
CERTIFICATE OF CORRECTION

PATENT NO. : 7,583,792 B2
APPLICATION NO. : 11/176816
DATED : September 1, 2009
INVENTOR(S) : Chriss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this

Fourteenth Day of September, 2010

David J. Kappos
*Director of the United States Patent and Trademark Office*